INVENTORS
P. MECKLENBURG
L.H. YOUNG
BY Lucian C. Canepa
ATTORNEY 3,462,749

MULTIPLE SHIFT REGISTER ARRANGEMENT

Paul Mecklenburg, Fort Lee, N.J., and Lawrence H. Young, Emmaus, Pa., assignors to Bell Telephone Laboratories, Incorporated, New York, N.Y., a corporation of New York Filed Mar. 10, 1966, Ser. No. 533,155
Int. Cl. G11b 5/02
U.S. Cl. 340—174 9 Claims

ABSTRACT OF THE DISCLOSURE

At least one biasing coil is coupled to an intermediate portion of the propagating medium of a domain-wall shift register to divide the medium into a plurality of distinct or isolated shift registers. Each such distinct register includes a nucleating coil and a sensing coil. The respective stored contents of the registers can be shifted in unison along the medium in an isolated manner by a common propagating structure. Such a multiregister arrangement is well suited to be included in various types of information processing equipment, such as, for example, an error control system of the interleaved type.

This invention relates to the processing of digital information and more particularly to a multiple shift register arrangement for processing such information.

Various digital information processing systems of practical importance require plural distinct shift registers as component parts thereof. Moreover, in some of these systems, it is required that the information representations stored in the respective registers be adapted to be shifted therethrough in unison. Typical of this latter system are certain error control equipments of the interleaved type.

An object of the present invention is the improvement of information signal processing equipment.

More specifically, an object of this invention is an improved multiple shift register arrangement for such equipment.

Another object of the present invention is a multiple shift register arrangement whose overall organization is characterized by compactness, ease of fabrication, reliability and simplicity of design.

These and other objects of the present invention are realized in a specific illustrative embodiment thereof which comprises a shift register of the so-called domain-wall type. A conventional register of this type includes, illustratively, a propagating medium such as a square loop magnetic wire in which successive unique regions are established by means of a nucleating coil coupled to the wire, the remainder of the wire remaining in its normal or cleared magnetic state. In turn, the nucleated regions are propagated in a controlled manner along the wire to an output region to which a sensing coil is coupled.

In accordance with the principles of the present invention, at least one biasing coil is coupled to an intermediate portion of the propagating medium. During the propagation phase of the mode of operation of the illustrative embodiment, a current is passed through the biasing coil to restore to the cleared magnetic state any unique regions propagated through the biasing coil. In this way the medium is in effect divided into a plurality of distinct or isolated shift registers. Each such distinct register includes a nucleating coil and a sensing coil. As indicated, adjacent registers are separated from each other by the biasing coils.

A common propagating structure is magnetically coupled to the medium along the entire length thereof. Information representations stored in the respective register sections may thereby be shifted in unison along the medium. But, as noted, the biasing coils are effective to prevent the propagation of unique regions from one section of the wire to the next adjacent section thereof.

Thus, in accordance with the invention, a conventional domain-wall register is structurally modified in a unique and simple manner to form plural distinct shift registers whose respective stored contents may be shifted in unison therealong in an isolated manner by a common propagating structure.

It is a feature of the present inveniton that a conventional domain-wall shift register including a propagating medium be modified by coupling to the medium at least one biasing coil to divide the register into a plurality of distinct storage sections.

It is a further feature of this invention that the plural storage sections be encompassed by a common propagating structure, whereby stored representations may be propagated along the medium in isolated unison.

A complete understanding of the present invention and the above and other objects, features and advantages thereof may be gained from a consideration of the following detailed description of a specific illustrative embodiment thereof presented hereinbelow in connection with the accompanying drawing, in which.

The basic type of domain-wall device of which the present invention constitutes a unique improvement is well-known in the art. K. D. Broadbent Patent 2,919,432, issued Dec. 29, 1959, describes the arrangement and mode of operation of such a device. In addition, detailed information on domain-wall shift registers is contained in a copending application of R. A. Kaenel, Ser. No. 515,897, filed Dec. 23, 1965.

Figure 1:
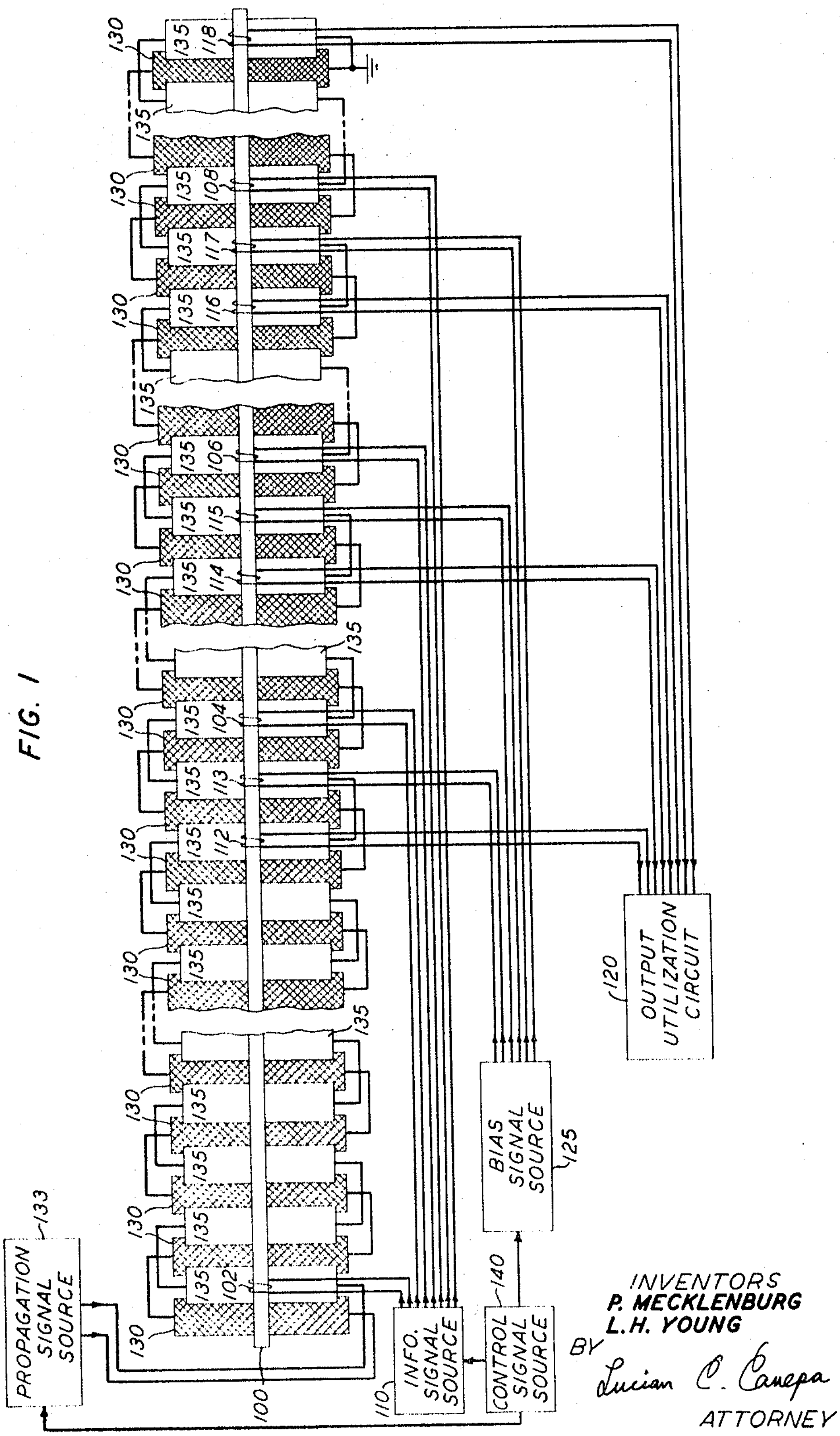
FIG. 1 depicts a specific illustrative multiple shift register arrangement made in accordance with the principles of the present invention.

The specific arrangement shown in FIG. 1 includes a propagating medium which for illustrative purposes is assumed to be a continuous length of wire 100 made of a suitable square-loop magnetic material. (One particularly suitable material is described in a copending application of D. H. Smith and E. M. Tolman, Ser. No. 458,140, filed May 24, 1964, now Patent 3,365,290, issued Jan. 23, 1968.) More generally, the medium is of a material characterized by the ability to maintain a reverse (magnetized) domain therein in response to a first magnetic field in excess of a nucleation threshold and the ability to move that domain therealong in response to a second field in excess of a propagation threshold and less than the nucleation threshold.

Coupled to the wire 100 of FIG. 1 are a plurality of nucleating or input coils 102, 104, 106 and 108 which are adapted to be pulsed by signals applied thereto from an information source 110. Also coupled to the wire 100 are a plurality of sensing or output coils 112, 114, 116 and 118 which are connected to apply any signals generated therein to an output utilization circuit 120.

Each successive set of nucleating and sensing coils shown in FIG. 1 defines the input and output of a distinct shift register. Thus the coils 102 and 112 constitute a portion of the input and output circuitry, respectively, of a first shift register section. Similarly, the sets of coils 104 and 114, 106 and 116, and 108 and 118, each define the extent of another distinct shift register. Hence it is apparent that the specific illustrative embodiment of FIG. 1 comprises four separate shift registers. From left to right in FIG. 1 these shift registers will be referred to herein as registers 1, 2, 3 and 4.

In accordance with the principles of the present invention, adjacent ones of the aforementioned four shift registers shown in FIG. 1 are separated by associated biasing coils. Specifically, the sensing coil 112 of shift register No. 1 is separated from the nucleating coil 104 of shift register No. 2 by a biasing coil 113. Similarly, the biasing coils 115 and 117 are effective to separate the registers 2 and 3, and the registers 3 and 4, respectively. Suitable signals, whose nature and time of occurrence are described below, are supplied to the biasing coils 113, 115 and 117 from a biasing source 125.

Input representations that are established in the shift register arrangement of FIG. 1 by the aforementioned nucleating coils 102, 104, 106 and 108 may be shifted or propagated along the medium 100 by means of a conventional array of two interconnected and overlapping sets of strap members. As shown in FIG. 1, the wire 100 overlays both sets of strap members. One set of strap members comprises a plurality of rectangular straps 130 which are shown cross-hatched in FIG. 1. The straps 130 are electrically interconnected to form a series circuit, one end of which is grounded and the other end of which is connected to a propagation signal source 133. The other set of strap members comprises a plurality of rectangular straps 135 which are also electrically interconnected to form a series circuit connected between ground and the source 133.

The propagation source 133 is adapted, in response to signals applied thereto from a control source 140, to apply 4-phase propagating signals of a well-known form to the noted sets of straps. As a result of such propagating signals, input representations stored in the medium 100 are shifted from left to right therealong in a step-by-step fashion. Since the propagating structure comprising the series-connected straps 130 and 135 encompasses the entire length of the medium 100, the shifting actions in the various distinct register sections thereof are accomplished in unison.

For illustrative purposes, the initial or cleared state of the medium 100 of FIG. 1 is assumed to be the right-to-left magentization condition thereof. In other words, the initial magnetic condition of the wire 100 can be represented by a horizontal arrow (not shown) pointing to the left. Illustratively, this magnetic condition is assumed to represent the binary "0" state. Assume then that the information source 110 applies to each of the nucleating coils 102, 104, 106 and 108, a pulse of the proper polarity to establish a reverse or left-to-right stable magnetic condition or domain in the wire portion coupled thereto. These reverse or unique domains are representative of "1" signals. Thereafter these "1" signals ar shifted in unison from left-to-right along the wire 100 by the aforementioned 4-phase propagating signals supplied by the source 133. Subsequently, other "0" or "1" information signals may be applied to the respective register sections from the source 110. In response to the application of a "0" information signal to a particular nucleating coil, no reverse domain is established in the wire 100 associated therewith. But in response to a "1" information signal applied thereto, a reverse domain is created in the wire 100.

Step-by-step propagation in the wire 100 of the initial "1" signals hypothesized above eventually causes the right-hand portion of the reverse domains representative thereof to pass through the respective sensing coils 112, 114, 116 and 118. As is well-known, this results in the generation in the sensing coils of output signals, which are applied to the utilization circuit 120. Thereafter these reverse domains tend to continue to be propagated to the right in the wire 100 in a conventional manner. However, in accordance with the principles of the present invention, the biasing signal source 125 is controlled by the source 140 to activate the biasing coils 113, 115 and 117 during the passage through these coils of the noted reverse domains. In particular, a current is passed through each of the coils 113, 115 and 117 of a polarity to cause the portions of the magnetic wire 100 coupled to the coils 113, 115 and 117 to be switched to the initial or cleared state. Thus any "1" signal representations propagated through the coils 113, 115 and 117 are inverted to "0" signals, and any "0" signals propagated therethrough are maintained as "0" signals. In this way adjacent shift register sections defined in the wire 100 are isolated from each other, whereby the information contents of one section cannot spill over into the next subsequent section to the right.

More specifically, the magnetic field generated by the biasing coils 113, 115 and 117 is opposed in direction to the field established by the nucleating coils 102, 104, 106 and 108. In addition, the field generated by the coils 113, 115 and 117 opposes the field established by the aforenoted propagation straps 130 and 135. As a result, the front or right-hand interface of each reverse domain or "1" representation is thereby prevented by the biasing fields from propagating further to the right. Consequently each such domain will collapse (revert to the initial magnetic condition) as the tail or left-hand interface of the domain is propagated to the right.

If the nucleating and biasing coils included in FIG. 1 are wound about the wire 100 in the same sense, then current flow in a first preassigned direction through the nucleating coils is effective to establish "1" signals or reverse magnetic domains in the wire 100. In that case current flow in the opposite direction through the biasing coils 113, 115 and 117 is effective to generate a magnetic field in opposition to the nucleation field, thereby to block any "1" signals from propagating from section to section in the depicted multiple shift register arrangement. Obviously other combinations of winding sense and current direction can be selected to accomplish exactly the same result.

Figure 2:
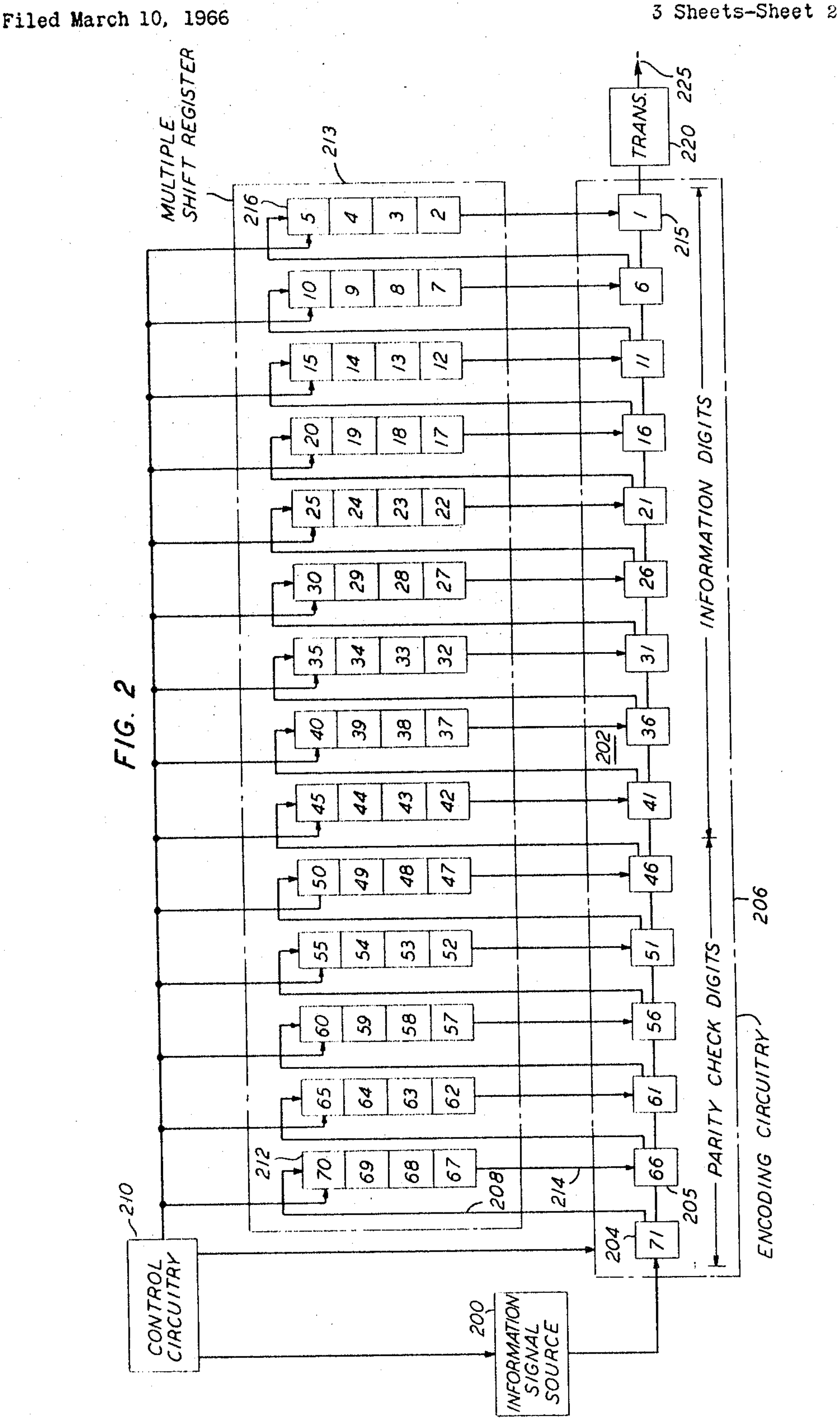
FIG. 2 shows the manner in which a multiple shift register of the type illustrated in FIG. 1 may be incorporated in the transmitting terminal of an interleaved error control system.
Figure 3:
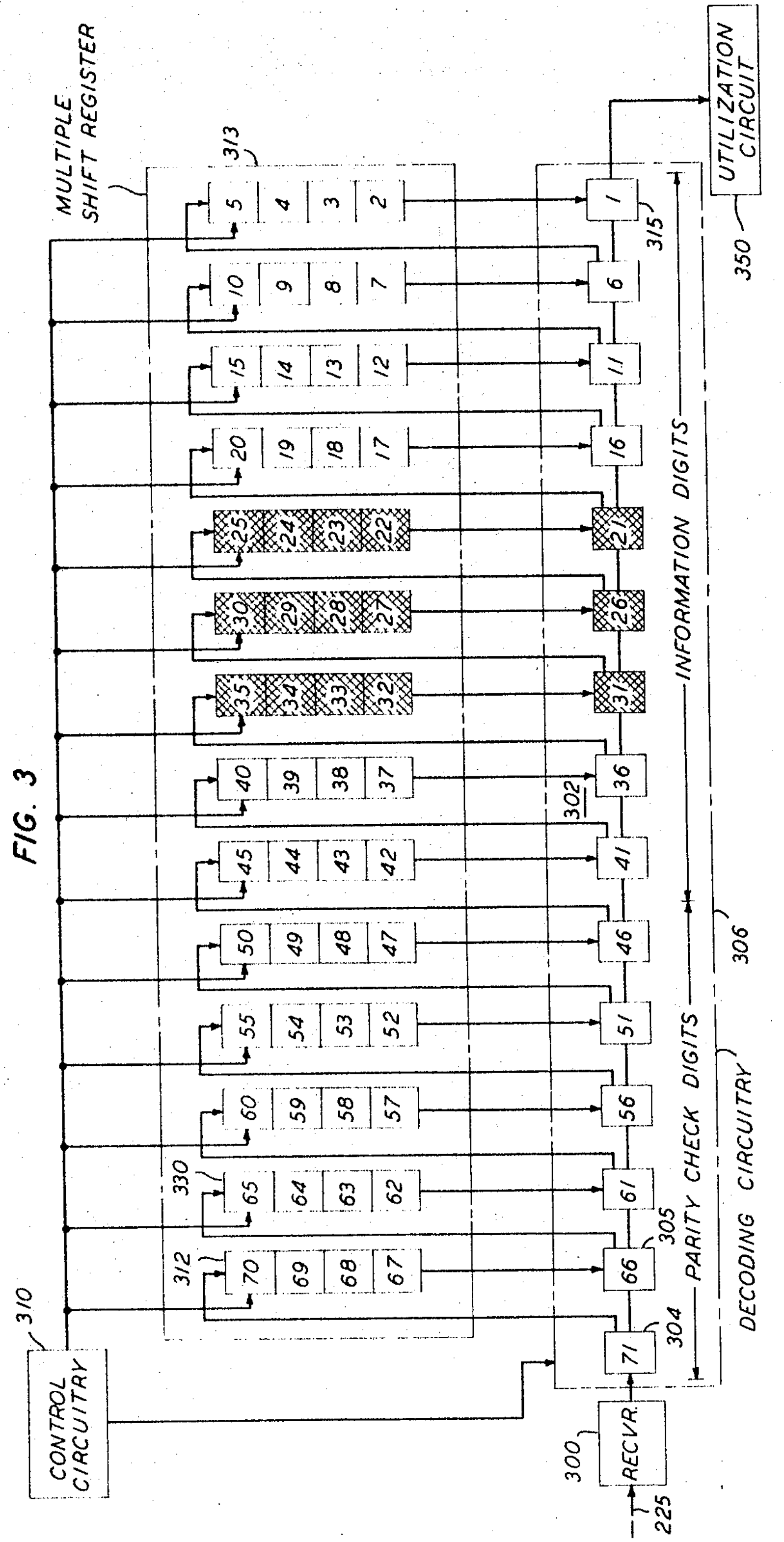
FIG. 3 illustrates the manner in which a multiple shift register arrangement of the FIG. 1 type may be included in the receiving terminal of the noted system.

The specific illustrative multiple shift register arrangement shown in FIG. 1 and described in detail above is well suited to be included in various information processing equipments. One such exemplary equipment comprises an error control system of the interleaved type. The transmitting and receiving terminals of one such illustrative system are represented in FIGS. 2 and 3, respectively. The utility and advantageous simplicity of the FIG. 1 arrangement will be particularly apparent from a brief consideration of the manner in which it forms a component part of the system of FIGS. 2 and 3.

The concept of interleaving a plurality of digital words, each derived in accordance with a conventional error-correcting code, to form a composite sequence possessing powerful burst-correcting capabilities is well-known in the art. The equipment shown in FIG. 2 is adapted to perform such an interleaving operation for conventional $(n, k)$ cyclic code words of the type described, for example in "Error-Correcting Codes" by W. W. Peterson, The M.I.T. Press and John Wiley & Sons, 1961.

To be specific, assume that the equipment shown in FIG. 2 includes a source 200 for supplying 45 consecutive information signals followed by 30 blank or "0" representations. These signals are applied to the last or 15th stage 204 of a conventional 15-stage shift register 202 that is included in encoding circuitry 206 of a well-known type. Then, in response to signals applied from control circuitry 210, the noted information signals are applied from the stage 204 via a lead 208 to the input digit position (designated 70) of a 4-stage shift register 212. The register 212 corresponds to one secton of the multiple register depicted in FIG. 1. (This multiple register is labeled 213 in FIG. 2.) In particular, the input lead 208 of the multiple register 213 corresponds symbolically to the nucleating coil 102 of FIG. 1. Furthermore, an output lead 214 of the register section 212 corresponds to the sensing coil 112 of FIG. 1. By applying appropriate propagating signals from the circuitry 210 to the shift register section 212, information signal representations are stepped in succession down through the register positions designated 69, 68 and 67. This stepping is accomplished as information signals continue to be sequentially applied to the stage 204 by the source 200 in synchronism with the stepping action. Subsequently, the first-supplied information signal is coupled via the output lead 214 to the next-to-the-last stage 205 of the conventional register 202.

Each 4-digit vertically-disposed section of the register 213 of FIG. 2 corresponds to a different isolated portion of the multiple register arrangement shown in FIG. 1. It is apparent that the stepping of stored information in unison through the various sections of the register 213 is easily accomplished by means of a common propagating structure of the type shown in FIG. 1.

Additional stepping or shifting of information signals through the various depicted shift register sections and the stages of the conventional register 202 eventually results in the 45 information signals supplied by the source 200 being stored in the correspondingly-numbered digit positions indicated in FIG. 2. The subsequent 26 blank signals supplied by the source 200 are stored in the digit positions or stages numbered 46 through 71. In other words, the first information signal supplied by the source 200 ends up stored in the first stage 215 of the conventional register 202; the second information signal is stored in the bottom digit position of the right-most shift register section 216 of the multiple register 213, and so forth. In particular, the 1st, 6th, 11th, 16th, 21st, 26th, 31st, 36th and 41st informatioin signals are respectively stored in the first nine stages of the register 202. At this point in the cycle of operation, the conventional encoding circuitry 206 is controlled by the circuitry 210 to generate six parity check digit signals from the nine information representations then stored in the register 202. The generation of these six signals is carried out in a well-known manner in accordance with a predetermined parity relationship characterristic of a (15, 9) triple-error burst-correcting cyclic code. The resulting six parity signals are stored in the left-hand six stages of the register 202. Thus, at that point in the cycle of operation, the register 202 contains therein a redundant 15-digit code word derived from nine spaced or interleaved ones of the information signals originally supplied by the source 200. As is well-known, this redundant word possesses a triple-error burst-correcting ability.

Next, the first digit of the aforementioned redundant 15-digit code word is applied from the stage 215 to a communication channel 225 via a transmitter 220. Concurrently therewith the entire contents of the multiple register 213 and the conventional register 202 is shifted as before by one digit position, and the 27th blank or "0" representation is supplied from the source 200. As a result of this shift, the right-hand nine stages of the register 202 then contain (from right-to-left, respectively) the 2nd, 7th, 12th, 17th, 22nd, 27th, 32nd, 37th and 42nd information signals. These nine signals are encoded. Subsequently, the second information signal, that is, the one stored in the stage 215, is applied to the channel 115 as the contents of the registers 202 and 213 is shifted again by one digit position.

The encoding process specified above and represented in FIG. 2 is continued until a total of five 9-digit information sequences have each been encoded. During this process, the first five information signals are applied to the channel 225. Thereafter no more encoding takes place. The remaining 40 information signals and the 30 previously-generated parity check signals are then simply applied in serial form to the channel 225 by the successive shifting of signals through the registers 202 and 213.

Thus it has been shown that a plural shift register arrangement of the type illustrated in FIG. 1 can be advantageously included in the transmitting terminal of an interleaved error control system to implement the encoding and interleaving operations therein.

Assume that the interleaved 75-digit sequence applied by the transmitter 220 of FIG. 2 to the channel 225 is mutilated during transmission. Specifically, assume that a noise occurrence on the channel causes the 21st through the 35th information digits of the sequence to be received in error. Without interleaving, this 15-digit error burst would clearly be outside the self-correcting capabilities of the specified (15, 9) code. However, because of the interleaving techniques described herein, the 15-digit burst is in effect parceled out and distributed among five different code words. The resutling bursts of three errors per code word are correctable. An illustrative terminal for performing the necessary decoding and correcting of received signals is shown in FIG. 3.

FIG. 3 shows a receiver 300 for applying received signals to the left-most stage 304 of a conventional 15-stage shift register 302 that is identical to the register 202 illustrated in FIG. 2. In fact, the entire overall arrangement of the receiving terminal is essentially identical to that included in the transmitting terminal of FIG. 2. The first 71 of the received signals are shifted in sequence through the stage 304, through the left-most section 312 of a multiple shift register 313, through the stage 305, through the section 330, and so forth. Eventually, due to successive step-by-step shifting of these received signals through the registers 302 and 313, the noted 71 signals are stored in sequence in the correspondingly-numbered stages of the registers 302 and 313. It is noted that 15 particular stages of these registers have been cross-hatched in FIG. 3 to denote that the information representations stored therein were received in error (due to the assumed 15-digit burst occurrence).

The numbered digit positions of the nine information digits shown stored in the right-hand nine stages of the register 302 of FIG. 3 correspond exactly to the first set of information digits encoded in the transmitting terminal of FIG. 2. Three of these information digits (those numbered 21, 26 and 31) are represented as having been received in error. Conventional decoding of the redundant word that includes these nine particular information digits results in detection and automatic correction of the three noted erroneous information digits. After the correction process is completed, the information digit stored in the right-most stage 315 of the register 302 is outpulsed to a utilization circuit 350. At the same time the entire contents of the registers 202 and 313 is stepped one digit position. As a result, the stage 304 then contains therein the 72nd received digit, and the nine right-most stages of the register 302 then contain the 2nd, 7th, 12th, 17th, 22nd, 27th, 32nd, 37th and 42nd information digits. These digits correspond exactly to the second set of information digits encoded in the transmitting terminal of FIG. 2. Three of the digits of this set of information digits, namely the 22nd, the 27th and the 32nd digits are depicted as being in error. However, as is known, the decoding operation is capable of automatically correcting these three erroneous digits.

After the decoding of the second specified code word is completed in the receiving terminal of FIG. 3, the second information digit (stored in the stage 315) is applied to the utilization circuit 350. Three additional shifts of signals through the registers 302 and 313 bring in succession the other three aforementioned encoded sequences into position in the circuitry 306 wherein the noted decoding operation is performed. The 3rd, 4th and 5th information signals are respectively outpulsed to the utilization circuit 350 after these operations. Decoding is now terminated. Then the corrected digits stored in the registers 302 and 313 are simply shifted in sequence to the circuit 350. It is noted that the corrected information digits are delivered to the circuit 350 in exactly the same order in which they were originally supplied by the source 200 of FIG. 2.

Thus it has been shown herein that a specific exemplary embodiment made in accordance with the principles of the present invention comprises a unique and structurally simple plural shift register arrangement. Additionally it has been shown that such an arrangement is adapted, illustratively, to be included in an interleaved error control system to facilitate encoding, interleaving and decoding operations therein.

It is to be understood that the above-described arrangements are only illustrative of the application of the principles of the present invention. In accordance with these principles, numerous other arrangements may be devised by those skilled in the art without departing from the spirit and scope of the invention. For example, the individual sections of the multiple shift register arrangement shown in FIG. 1 may be structured to define any desired number of stages or information digit positions. Moreover, it is apparent that the number of stages in each of these sections need not be the same.

Furthermore, it is well-known in the art that the basic domain-wall device of which the present invention constitutes an improvement may take many different forms. In this connection it is to be understood that the biasing techniques of the present invention are generally applicable to the basic device whatever particular form it takes.

For ease of synchronization in the operation of a device of the type shown in FIG. 1, it may be advantageous that an input to and an output from a particular register section occur in an in-phase relationship. However, the mode of operation of the illustrative embodiment is clearly not limited to such in-phase operation of a single section. Inputting and outputting may conveniently be timed to occur in an out-of-phase mode of operation.

Similarly, the input and output operations in the plural distinct sections of the register arrangement shown in FIG. 1 may be clocked to all occur at the same time. Alternatively, however, the inputting and outputting of each section may be timed to be completely independent of and unrelated to the same operations in other sections. Thus, for example, an input signal may be applied to one section in coincidence with phase No. 1 of the aforementioned 4-phase propagation sequence and an output may be derived from that section in coincidence with, say, phase No. 3. Another distinct section may be timed to receive inputs in coincidence with phase No. 2 and to supply outputs at the time of occurrence of phase No. 4, and so forth.

What is claimed is:

1. In combination, a continuous medium for propagating distinct "1" and "0" signal representations, and means dividing said medium into a plurality of sections for preventing the propagation of "1" representations between adjacent sections by converting to a "0" representation any "1" representation attempted to be propagated through said means.

2. A combination as in claim 1 wherein said continuous medium comprises a wire made of a square-loop magnetic material, said combination further including means magnetically coupled to successive portions of said wire for defining in each such portion spaced-apart input and output circuitry, and wherein said defining means comprises a biasing winding magnetically coupled to said wire intermediate adjacent ones of said portions.

3. A combination as in claim 2 further including an information signal source connected to said input circuitry for establishing in said wire "0" and "1" in formation signal representations, and a utilization circuit connected to said output circuitry.

4. A combination as in claim 3 further including means magnetically coupled to said wire for propagating therealong any "0" and "1" information signal representations introduced into said wire via said input circuitry.

5. A combination as in claim 4 still further including a source connected to said biasing winding(s) for applying thereto a signal which is effective to switch the wire coupled thereto to the "0" signal representation.

6. In combination in a multiple shift register arrangement, a continuous magnetic medium having a square-loop property and being characterized by a quiescent magnetic state, means coupled to said medium at a plurality of spaced regions for defining input-output circuitry for said arrangement, and means intermediate said spaced regions and coupled to said medium for biasing a single continuous portion of said medium to said quiescent magnetic state.

7. A combination as in claim 6 further including means connected to said defining means for applying binary input signals thereto such that discrete domains of said medium are switched to the nonquiescent magnetic state in response to input signals of one character and are maintained in the quiescent magnetic state in response to input signals of the other character.

8. A combination as in claim 7 further including an output utilization circuit connected to said defining means.

9. A combination as in claim 8 still further including means coupled to said medium for propagating in unison therealong magnetic states established in said spaced regions.

References Cited

UNITED STATES PATENTS

| | | | |
|---|---|---|---|
| 3,114,898 | 12/1963 | Fuller | 340—174 |
| 3,241,127 | 3/1966 | Snyder | 340—174 |

BERNARD KONICK, Primary Examiner

G. M. HOFFMAN, Assistant Examiner